Figure 1:
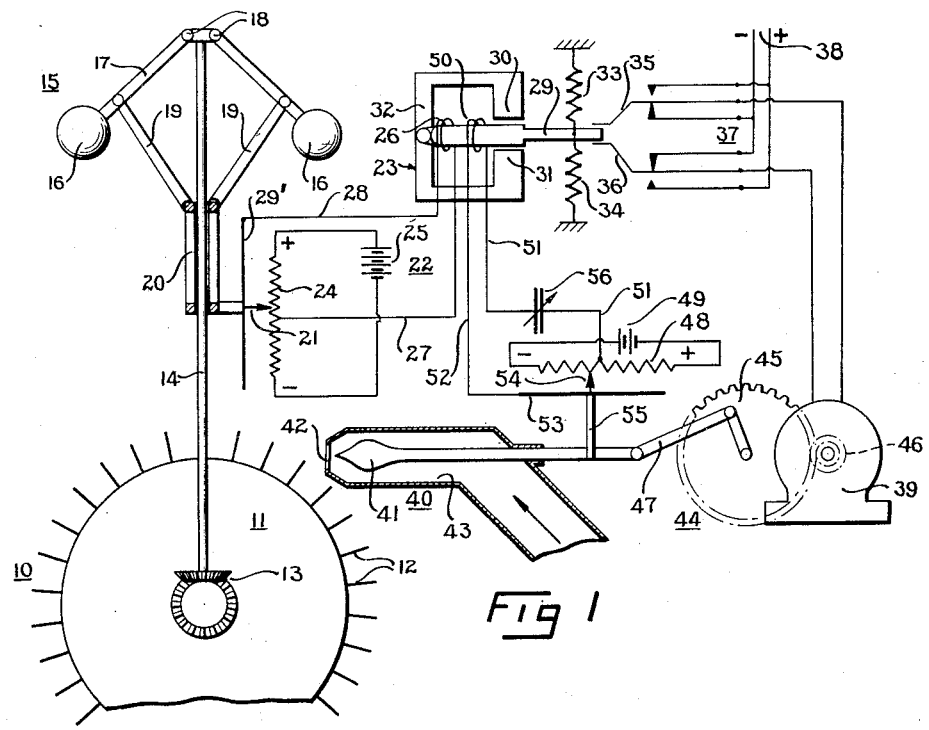

Nov. 11, 1941.    F. FISCHER    2,262,173

AUTOMATIC REGULATING APPARATUS

Filed May 12, 1939

INVENTOR.
Franz Fischer
BY
Stephen Cerstvik
ATTORNEY.

Patented Nov. 11, 1941

2,262,173

UNITED STATES PATENT OFFICE 2,262,173

AUTOMATIC REGULATING APPARATUS

Franz Fischer, Berlin-Wilmersdorf, Germany, assignor to Siemens Apparate und Maschinen Gesellschaft mit beschränkter Haftung, Berlin, Germany, a corporation of Germany Application May 12, 1939, Serial No. 273,356
In Germany May 17, 1938

7 Claims. (Cl. 121—41)

This invention relates to automatic regulating apparatus, and more particularly to such apparatus for regulating a predetermined operating condition of a second apparatus.

One of the objects of the present invention is to provide a novel regulating apparatus having a follow-up device which is extremely simple in construction and which occupies a small amount of space.

Another object of the invention is to provide a novel apparatus of the above character which employs a minimum number of moving parts.

A further object is to provide a novel regulating apparatus which operates smoothly.

An additional object is to provide apparatus of the above character in which the smoothness of operation is adjustable.

Another object is to provide a novel apparatus for maintaining a vehicle upon a desired course, or maintaining an engine at a predetermined speed, in which an electric impulse is produced for aiding in regaining the course of the vehicle or the speed of the engine, the impulse being a function of the departure from the prescribed condition.

The above and further objects and novel features will more fully appear when the same is read in connection with the accompanying drawing. It is to be expressly understood, however, that the drawing is for the purpose of illustration only and is not intended as a definition of the limits of the invention, reference for the latter purpose being had to the appended claims.

Figure 2:
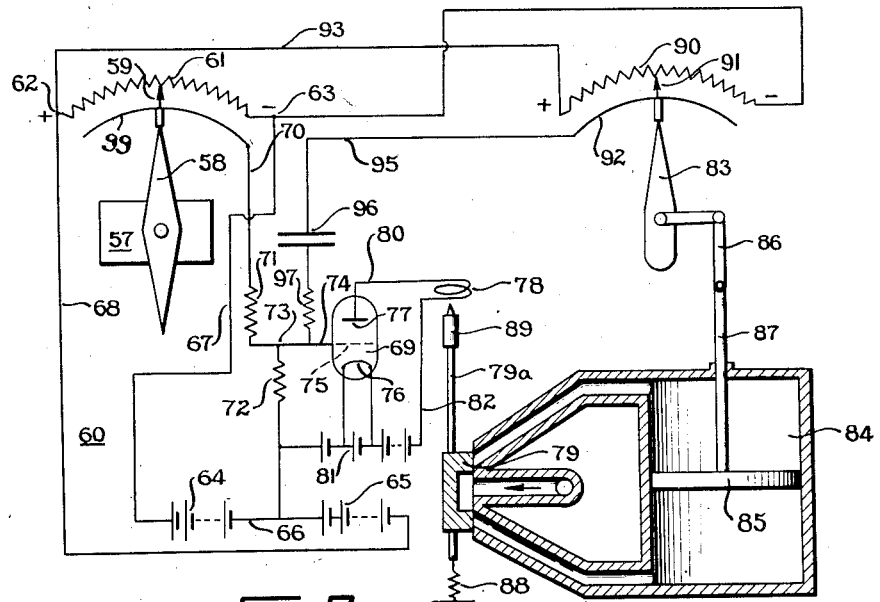

In the drawing wherein like reference characters refer to like parts throughout the several views, Fig. 1 is a schematic diagram of one embodiment of the invention; and Fig. 2 is a schematic diagram of a second embodiment of the invention.

The forms of the invention illustrated in the accompanying drawing, by way of example, comprise regulating apparatus for maintaining a predetermined operating condition as a speed of an engine, or a course of a vehicle. Suitable means are provided for controlling a circuit, which is designated as a transmitter circuit, in response to departures of the arrangement to be governed from a given operating condition. The transmitter circuit is operatively connected to means for controlling a servo-motor which in turn is operatively connected to means for restoring said operating condition, the last named means comprising, for example, an engine throttle or a control surface of a craft. In order to insure a rapid and smooth regulation or restoration, a circuit designated as a return or restoring circuit is employed for providing return impulses which act upon the servo-motor control means in opposition to the impulses of the transmitter circuit, the return circuit being governed by the movements of the servo-motor. A condenser is inserted in the return circuit which permits the return impulses to act only during periods when the servo-motor is in motion.

In the form shown in Fig. 1 the novel apparatus comprises a regulating device or speed governor for a fluid driven turbine 10 having a rotor 11 with blades 12 thereon. Speed responsive means which are operatively connected to the rotor by means of a bevel gear train 13 and a shaft 14, are constituted by a conventional centrifugal ball arrangement 15 having balls 16 secured to the free extremities of arms 17. The latter are pivotally mounted at 18 and position by means of articularly connected rods 19, a sleeve 20 which surrounds and is axially shiftable upon shaft 14 and to which is attached a control element 21 of a transmitter circuit 22.

In order to provide an initial electrical impulse or "transmitter magnitude" for actuating a servo-motor control device 23 in a manner to later appear, the transmitter circuit is employed comprising, in the form shown, a variable resistance 24 having opposite extremities thereof connected to a source of electric energy 25. A transmitter circuit control coil 26 is in connection with the resistance by means of a lead 27, which is attached centrally thereto, and by a lead 28 which is attached to a bar 29. The control element 21 slidably engages bar 29 and resistance 24.

Coil 26 is in operative connection with the servo-motor control device 23, and surrounds a pivotally mounted switch lever 29, which moves between opposite poles 30, 31 of a magnet 32, and is normally held in a centralized position therebetween by opposed springs 33, 34. In the latter position lever 29 is also centralized between a pair of arms 35, 36 of a switch 37 which governs the direction of flow of current from a source 38 to a servo-motor 39.

A suitable throttle or performance control device 40 is provided for the turbine which is constituted, for example, by a needle control valve 41 which is axially movable, adjacent an orifice 42, in a tube 43 through which the turbine driving fluid passes. Valve 41 is positionable by motor 39 by means of a gear arrangement 44 including a gear 45 which meshes with a gear 46 upon the motor, and which by an arm 47 is connected to a shaft 41a of said valve.

Means must be employed in combination with the above apparatus to provide for smooth operation, and to insure that a smooth reaction occurs to a change in speed of the turbine whereby a restoration or return of the servo-motor control means to a neutral position is accomplished, and whereby the motion of the throttle is terminated at a point which will precisely attain a speed restoration. The novel means in the form shown comprise a restoring or return circuit which is constituted by a second variable resistance 48, analogous to the first resistance 24, and connected at each extremity thereof to a source of direct current 49. A return circuit control coil 50 surrounding switch lever 29 adjacent coil 26 is connected to resistance 48 by means of a lead 51 centrally attached to the resistance, and by a lead 52 attached to a bar 53. A return circuit control element 54 slidably engages both bar 53 and resistance 48, and is attached to valve rod 41a by means of an arm 55, the motion of the element 54 thereby becoming responsive to the movement of motor 39.

In order to simplify the return circuit, to eliminate the necessity of certain moving parts such as "lagging mechanisms," and to provide for the above-mentioned smooth operation, a condenser 56 is novelly combined with the regulating apparatus by being inserted in lead 51 of the return circuit. A particularly smooth control is obtained if the time constant of the return circuit is selected as comparatively great with respect to the period of natural vibration of the regulating system. In order to adjust this time constant the condenser 56 may be variable.

In operation the apparatus is adjusted to maintain a predetermined speed. The control elements 21 and 54 are adjusted centrally upon their respective resistances. If the speed increases, balls 16 move upwardly thereby displacing element 21 from the central position opposite lead 27. A transmitter control impulse is produced which will overcome the pressure of springs 33, 34 of the servo-motor control device 23 and will move either arm 35 or 36. The servo-motor 39 then moves the valve 41 to the left, thereby restricting the orifice 42. Concurrent with the movement of rod 41a, the control element 54 moves away from its central position. During the movement, that is, only during the period of voltage fluctuation caused by the movement of element 54, a current impulse is permitted to pass by the condenser 56. During this period of movement an electric field is produced in coil 50 which tends to counteract the field of coil 26. If the displacement of valve 41 has sufficiently throttled the driving medium the desired speed will be obtained and the transmitter circuit control element 24 will be restored to its central position. Thus the current in the transmitter circuit will be zero, and the current in the return circuit will also be zero provided that the movement of the return circuit control element 54 has ceased. Consequently the switch lever 24 will be centralized and an accurate adjustment of the speed will be attained even though the element 54 remains deflected from its original central position.

In the form shown in Fig. 2 is a second embodiment of the regulating apparatus which is employed in connection with an aircraft for maintaining the craft upon a prescribed course. This embodiment is used in combination with a direction indicator or compass 57 having a pointer 58 which positions a control element 59 of a transmitter circuit 60. The latter is constituted by a resistance 61 having the opposite extremities 62, 63 thereof connected respectively to opposite terminals of, for example, batteries 64, 65, the batteries being interconnected by a lead 66. Terminal 63 is connected to battery 64 by a lead 67, and terminal 62 is connected to battery 65 by a lead 68.

The remainder of the transmitter circuit is constituted by suitable connections for controlling the grid voltage of an amplifier 69 for a purpose to later appear. The connections comprise a bar 99 adjacent resistance 61, the bar and resistance both being slidably engaged by element 59. A lead 70 which is attached to one extremity of bar 99, and which has two resistances 71 and 72 inserted in series therein, is in connection with lead 66. As a point 73 intermediate the resistances 71, 72, a lead 74 is connected to a grid 75 of the amplifier 69 which, for example, is a triode having a directly heated cathode 76 and an anode 77. A coil 78 for controlling a servo-motor valve 79, in a manner to be later set forth, is connected to anode 77 by a lead 80, and also to one extremity of a grid battery 81 by a lead 82. The cathode 76 is also connected into the battery 81. An opposite extremity of said battery is connected to the lead 70 at a point intermediate resistance 72 and lead 66.

In order that a control surface 83 of the craft be positioned in accordance with the grid voltage, which as above set forth is a partial function of the deviation of the craft from a desired course, a servo-motor 84 is provided which, for example, is of a hydraulic variety having a conventional piston 85 and control valve 79. Piston 85 is operatively connected to surface 83 by means of a lever 86 pivotally secured to a piston rod 87. The valve 79 is normally held in a centralized position by means of a spring 88 whereby the motor is rendered inoperative. The spring 88 maintains the valve in this position when a normal or steady current flows in coil 78 and exerts a normal attraction upon a plunger or core 89 attached to an extremity of a valve rod 79a which is rigidly secured to the valve 79 at the opposite extremity thereof.

A return circuit for the embodiment is provided for a purpose analogous to that above explained in connection with the first embodiment. This circuit comprises means for controlling the grid voltage of amplifier 69 in combination with the transmitter circuit and is constituted by a variable resistance 90 having a control element 91 which slidably engages both the resistance and a bar 92, and which is moved in response to the displacement of the control surface 83. By this arrangement a voltage may be governed as a function of said displacement. Opposite extremities of resistance 90 are connected to terminals 62, 63 by leads 93, 94 respectively. The bar 92 is connected at one extremity thereof to the grid circuit of amplifier 69 by means of a lead 95 in which are inserted a condenser 96 and a resistance 97. The function of condenser 96 is analogous to that of condenser 56 of the first embodiment.

The drop in voltage at the resistance 72, which is common to both the transmitter and return circuits, together with the fixed grid voltage of battery 81 forms the drop in voltage between the grid and cathode of tube 69. The grid voltage, in this connection, is selected sufficiently great so that upon a drop in voltage to zero at the resistance 72 the tube operates in the middle of its characteristic.

In operation the craft is directed upon a prescribed course, the control elements 59 and 91 are centered. If the craft deviates from its course the element 59 is first deflected. A voltage drop occurs in resistance 72. The core 89 is attracted thus moving valve 79 from a centralized position, the movement occurring against the pressure of spring 88. The piston of motor 84 moves downwardly and a deflection of control surface 83 takes place. Concurrent with the deflection of surface 83 a current is caused to flow in the return circuit which is opposite to that in the transmitter circuit. Consequently the core 89 is returned to its initial position. Since current can pass through the condenser only during a movement of the control surface, i. e., only during a change in potential, the return action ceases when the control element 59 is recentralized even though the element 91 remains removed from its central position but stationary.

There is thus provided novel regulating means which are especially adapted for use aboard aircraft, for example, in controlling the course thereof. The apparatus has suitable means novelly combined therewith for insuring a smooth and accurate operation and for attaining a precise regulation. These means greatly simplify the construction of the apparatus, reduces its weight and provides for a positive action thereof at all times.

Although only two embodiments have been illustrated and described in detail it is to be expressly understood that the same is not limited thereto. Various changes may be made in the design and arrangement of the parts without departing from the spirit and scope of the invention as the same will now be understood by those skilled in the art. For a definition of the limits of the invention reference will be had primarily to the appended claims.

What is claimed is:

1. In apparatus of the class described, a transmitter circuit including a control element therefor, means for positioning said element in a predetermined condition whereby zero voltage exists in said circuit, a restoring circuit including a control element therefor, a servo-motor operatively connected to the last-named control element, control means for said servo-motor being operatively connected to said transmitter and restoring circuits, said control means being operative to actuate said servo-motor when said first-named element departs from the predetermined condition producing a voltage in said transmitter circuit energizing said control means, and a condenser in said restoring circuit whereby an electrical impulse is communicated to said control means with each movement of said restoring circuit control element for counteracting said transmitter voltage, said control means being de-energized when said first-named element attains its predetermined condition.

2. In apparatus of the class described, a transmitter circuit including a slidable element therefor, a control member for positioning said element in a predetermined condition whereby zero voltage exists in said circuit, a restoring circuit including a slidable element therefor, a servo-motor mechanically connected to the last-named slidable element, condition restoring means associated with said servo-motor, control means for said servo-motor being electrically connected with said transmitter and restoring circuits, said control means being operative to actuate said servo-motor when said control member departs from the predetermined condition producing a voltage in said transmitter circuit energizing said control means, and a condenser in said restoring circuit whereby electrical impulses are communicated to said control means with each movement of said condition restoring means in opposition to said transmission voltage, said control means being de-energized when said control member attains its predetermined position.

3. In apparatus of the class described, a transmitter circuit including a control element therefor, a control member for positioning said element in a predetermined condition whereby zero voltage exists in said circuit, a restoring circuit including a control element therefor, a servo-motor operatively connected to the last-named control element, a controlled member operatively connected to said servo-motor, control means for said servo-motor being operatively connected to said transmitter and restoring circuits, said control means being operative to actuate said servo-motor when said control member departs from the predetermined condition producing a voltage in said transmitter circuit energizing said control means, and a condenser in series with said restoring circuit whereby electrical impulses are communicated to said control means with each movement of said controlled member for counteracting said transmitter voltage, said control means being de-energized when said control member attains its predetermined position.

4. In apparatus of the class described, a transmitter circuit including a control element therefor, governing means for said control element, a restoring circuit including a restoring control element therefor, a servo-motor operatively connected to said restoring control element, switch means for said servo-motor electrically connected to said transmitter and restoring circuits, said switch means being energized to operate said motor during operation of said governing means, and a condenser in said restoring circuit for emitting electrical impulses to said switch means during operation of said motor to de-energize said switch means.

5. In apparatus of the class described, a transmitter circuit, a restoring circuit including a control element, amplifying means for current in said circuits including an amplifying tube having a grid therein, a portion of said circuits being common to both, the grid voltage of said tube being responsive to a voltage drop in said portion of the circuits, a servo-motor, the latter being operatively connected to the control element, and means for controlling said servo-motor as a function of said grid voltage.

6. In apparatus of the class described, a transmitter circuit, means for controlling the extent of electrical disturbances therein, a restoring circuit including a control element therefor, a condenser in said return circuit, amplifying means for current in said circuits including an amplifying tube having a grid therein, a portion of said circuits being common to both, the grid voltage of said tube being responsive to the magnitude of voltage drops in said portion of the circuits, a servo-motor, the latter being operatively connected to said control element, and means for controlling said servo-motor as a function of said grid voltage.

7. In apparatus of the class described, an electrical circuit including a control element therefor, means for initially positioning said element whereby the circuit is balanced, a restoring circuit including a control element therefor, a servomotor operatively connected to the last named control element, control means for said servomotor being electrically connected to said transmitter and restoring circuits, said control means being energized to operate said motor when said first-named control element departs from said initial position, and a condenser inserted in series with said restoring circuit whereby electrical impulses are communicated to said control means during operation of said motor to de-energize said control means.

FRANZ FISCHER.